United States Patent
Walls et al.

(10) Patent No.: US 7,289,045 B1
(45) Date of Patent: Oct. 30, 2007

(54) TWO-STAGE CODEC FOR FRAME-BASED PROGRAM IMAGES

(75) Inventors: William R. Walls, Hatboro, PA (US); Charles L. Martin, Blue Bell, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/472,157

(22) Filed: Jun. 21, 2006

(51) Int. Cl.
*H03M 7/30* (2006.01)

(52) U.S. Cl. .......................................... 341/50; 341/87
(58) Field of Classification Search .................. 341/50, 341/51, 55, 87
See application file for complete search history.

(56) References Cited

U.S. PATENT DOCUMENTS

| | | | | |
|---|---|---|---|---|
| 5,502,439 | A | * | 3/1996 | Berlin .......................... 341/51 |
| 6,006,232 | A | * | 12/1999 | Lyons ......................... 707/101 |
| 6,188,333 | B1 | | 2/2001 | Cooper ......................... 341/51 |
| 6,624,762 | B1 | | 9/2003 | End, III ........................ 341/51 |
| 2005/0198062 | A1 | * | 9/2005 | Shapiro ....................... 707/102 |

OTHER PUBLICATIONS

Honeywell Experion PKS R300, ARC Advisory Group, Apr. 2005.

* cited by examiner

*Primary Examiner*—Howard L. Williams
(74) *Attorney, Agent, or Firm*—Kermit D. Lopez; Luis M. Ortiz

(57) ABSTRACT

A method for compressing a frame-based program image (FBPI) includes identifying common envelope data in the FBPI. Identified common envelope data is removed from the FBPI. At least one instance of an identical repeated frame of the FBPI is identified. A first instance of an identified identical repeated frame is replaced with a pointer to a second instance of the identified identical repeated frame. A method for decompressing a compressed FBPI includes identifying at least one pointer in a compressed FBPI, wherein the at least one pointer comprises a reference to an identical repeated frame of the FBPI. The identified at least one pointer is replaced with the identical repeated frame to which the at least one pointer refers, to generate a half-decompressed FBPI. Envelope data is inserted into the half-decompressed FBPI to generate a full-decompressed FBPI. A computer program product and a system for compressing/decompressing an FBPI are also provided.

18 Claims, 4 Drawing Sheets

TWO-STAGE CODEC FOR FRAME-BASED PROGRAM IMAGES

TECHNICAL FIELD

Embodiments are generally related to computer performance, processing systems, and storage environments. Embodiments are additionally related to application of a two-stage codec for frame-based program images.

BACKGROUND OF THE INVENTION

Modern computer systems employ storage systems and devices to hold data and/or instructions. Common examples of storage systems in a real-time micro-processor-based product include, for example, magnetic media (e.g., disks), random access memory (RAM), and read-only memory (ROM). Storage space is typically an important and expensive commodity, regardless of where the storage space is located relative to the central processing unit (CPU) or other processing unit executing the stored instructions or otherwise acting on the stored data. Ordinarily, ROM storage space is often at an even higher premium in both physical layout and product cost than RAM or disk space. Accordingly, modern computer systems typically seek to reduce the amount of required ROM space while simultaneously meeting code size and other performance limitations of a real-time system.

One method to reduce the size of a file or program in storage is to employ a codec (compression/decompression algorithm). One example of a modern codec is the Limpel-Ziv-Welsh (LZW) algorithm. Generally, codecs provide a standardized method to encode data/instructions for storage or transmission and to decode data/instructions for manipulation. Storage codecs in particular are typically designed to reduce the size-on-disk (or, generally, size-in-storage) of the target files.

Executable files, however, are sometimes loaded into memory as a series of instructions in a program image. Typical codecs apply a cumbersome overhead that reduces the effectiveness of the codec for such program images. For example, an increased program size, slower execution speed, and in some cases increased storage space can all result from an inefficient codec.

Therefore, what is required is a system, apparatus, and/or method that provides improved compression/decompression performance that overcomes at least some of the limitations of previous systems and/or methods.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved compression/decompression scheme.

It is a further aspect of the present invention to provide for an improved processing system.

It is a further aspect of the present invention to provide for an improved frame-based program image processing system.

The aforementioned aspects and other objectives and advantages can now be achieved as described herein. A method for compressing a frame-based program image (FBPI) includes identifying common envelope data in the FBPI. Identified common envelope data is removed from the FBPI. At least one instance of an identical repeated frame of the FBPI is identified. A first instance of an identified identical repeated frame is replaced with a pointer to a second instance of the identified identical repeated frame.

A method for decompressing a compressed FBPI includes identifying at least one pointer in a compressed FBPI, wherein the at least one pointer comprises a reference to an identical repeated frame of the FBPI. The identified at least one pointer is replaced with the identical repeated frame to which the at least one pointer refers, to generate a half-decompressed FBPI. Envelope data is inserted into the half-decompressed FBPI to generate a full-decompressed FBPI. A computer program product and a system for compressing/decompressing an FBPI are also provided.

In an alternate embodiment, a system for compressing a frame-based program image (FBPI) includes a processor configured to retrieve an uncompressed FBPI from a main storage. A compressor is coupled to the processor and configured to identify common envelope data in the FBPI, remove identified common envelope data from the FBPI to generate a half-compressed FBPI, identify at least one instance of an identical repeated frame of the half-compressed FBPI, and replace a first instance of an identified identical repeated frame with a pointer to a second instance of the identified identical repeated frame to generate a full-compressed FBPI. The processor is further configured to transmit the full-compressed FBPI to a target device.

A system for decompressing a compressed frame-based program image (FBPI) includes a processor configured to receive a full-compressed FBPI. A decompressor is coupled to the processor and configured to identify at least one pointer in the full-compressed FBPI, wherein the at least one pointer comprises a reference to an identical repeated frame of a decompressed FBPI based on the full-compressed FBPI, replace the identified at least one pointer with the identical repeated frame to which the at least one pointer refers, to generate a half-compressed FBPI, and insert envelope data into the half-compressed FBPI to generate a decompressed FBPI. The processor is further configured to load the decompressed FBPI into a local storage for execution.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment of the present invention and are not intended to limit the scope of the invention.

Figure 1:
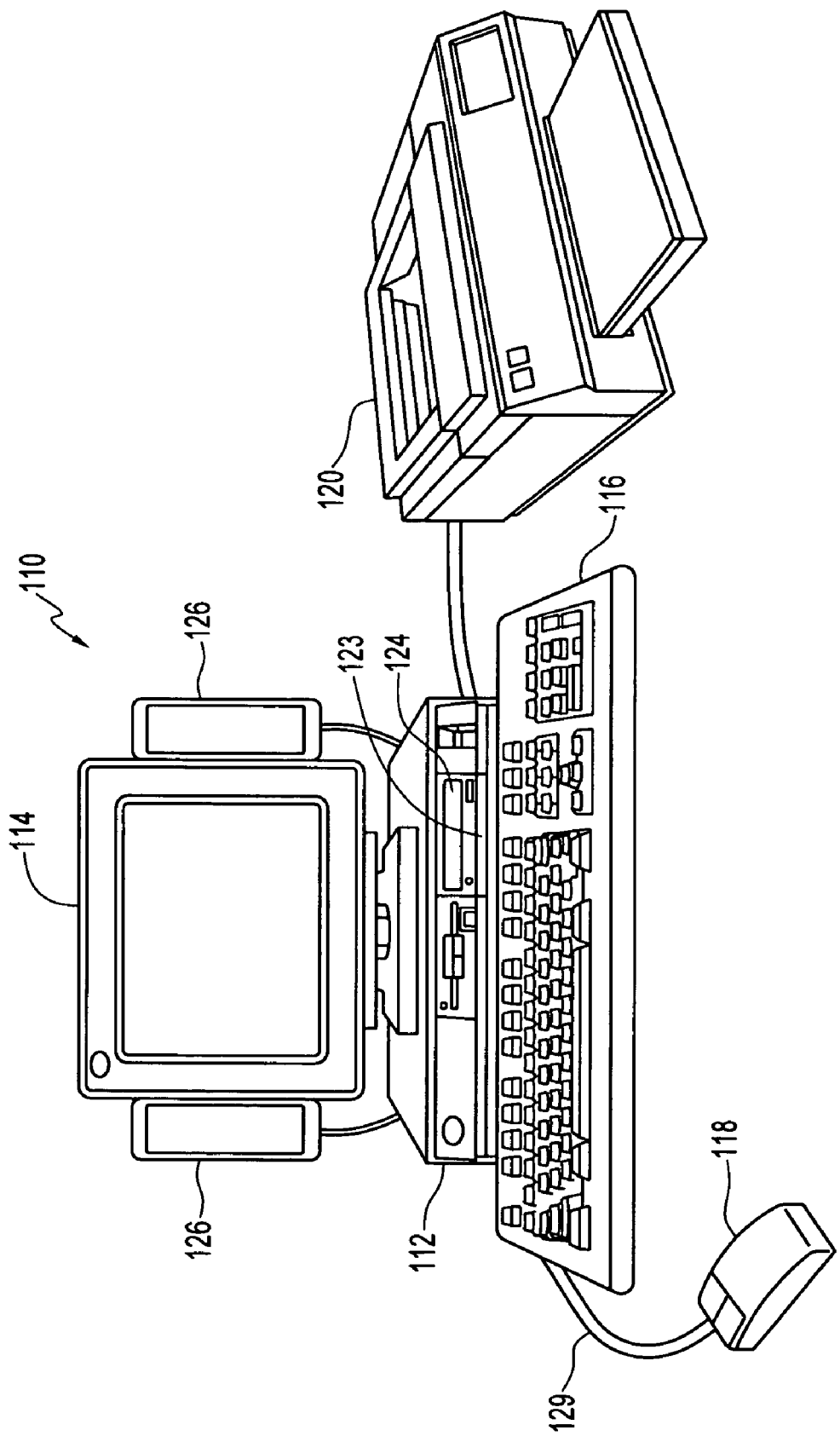
FIG. 1 illustrates a pictorial representation of a computer system in which a preferred embodiment of the present invention can be implemented.

With reference now to the figures and in particular with reference to FIG. 1, there is depicted an embodiment of a computer system that can be utilized to implement the preferred embodiment. Data-processing system 110 includes processing unit 112, video-display terminal 114, keyboard 116, pointing device 118, printer 120, and speakers 126. Processing unit 112 receives input data from input devices such as keyboard 116, pointing device 118, and local area network interfaces (not illustrated) and presents output data to a user via video-display terminal 114, pointer 120, and speakers 126.

Keyboard 116 is that part of data-processing system 110 that resembles a typewriter keyboard and that enables a user to control particular aspects of the computer. Because information flows in one direction, from keyboard 116 to processing unit 112, keyboard 116 functions as an input-only device. Functionally, keyboard 116 represents half of a complete input/output device, the output half being video-display terminal 114. Keyboard 116 includes a standard set of printable characters presented in a "QWERTY" pattern typical of most typewriters. In an alternate embodiment, keyboard 116 can be configured in a Dvorak pattern layout, as one skilled in the art will understand. In addition, keyboard 116 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video-display terminal 114.

Video-display terminal 114 is the visual output of data-processing system 110. As indicated herein, video-display terminal 114 can be a cathode-ray tube (CRT) based video display well known in the art of computer hardware. But with a portable or notebook-based computer, video-display terminal 114 can be replaced with a liquid crystal display (LCD) based or gas, plasma-based, flat-panel display.

Pointing device 118 is preferably utilized in conjunction with a graphical user-interface (GUI) in which hardware components and software objects are controlled through the selection and the manipulation of associated graphical objects displayed within video-display terminal 114. Although data-processing system 110 is illustrated with a mouse for pointing device 118, other graphical-pointing devices such as a graphic tablet, joystick, track ball, touch pad, or track pad could also be utilized. Pointing device 118 features a casing with a flat bottom that can be gripped by a human hand. Pointing device 118 can include buttons on the top, a multidirectional-detection device such as a ball on the bottom, and cable 129 that connects pointing device 118 to processing unit 112.

To support storage and retrieval of data, processing unit 112 further includes diskette drive 122, hard-disk drive 123, and CD-ROM drive 124, which are interconnected with other components of processing unit 112, and which are further described below under the description for FIG. 2.

Data-processing system 110 can be implemented utilizing any suitable computer. But, a preferred embodiment of the present invention can apply to any hardwired configuration that allows the display of windows, regardless of whether the computer system is a complicated, multi-user computing apparatus, a single-user workstation, or a network appliance that does not have non-volatile storage of its own.

Figure 2:
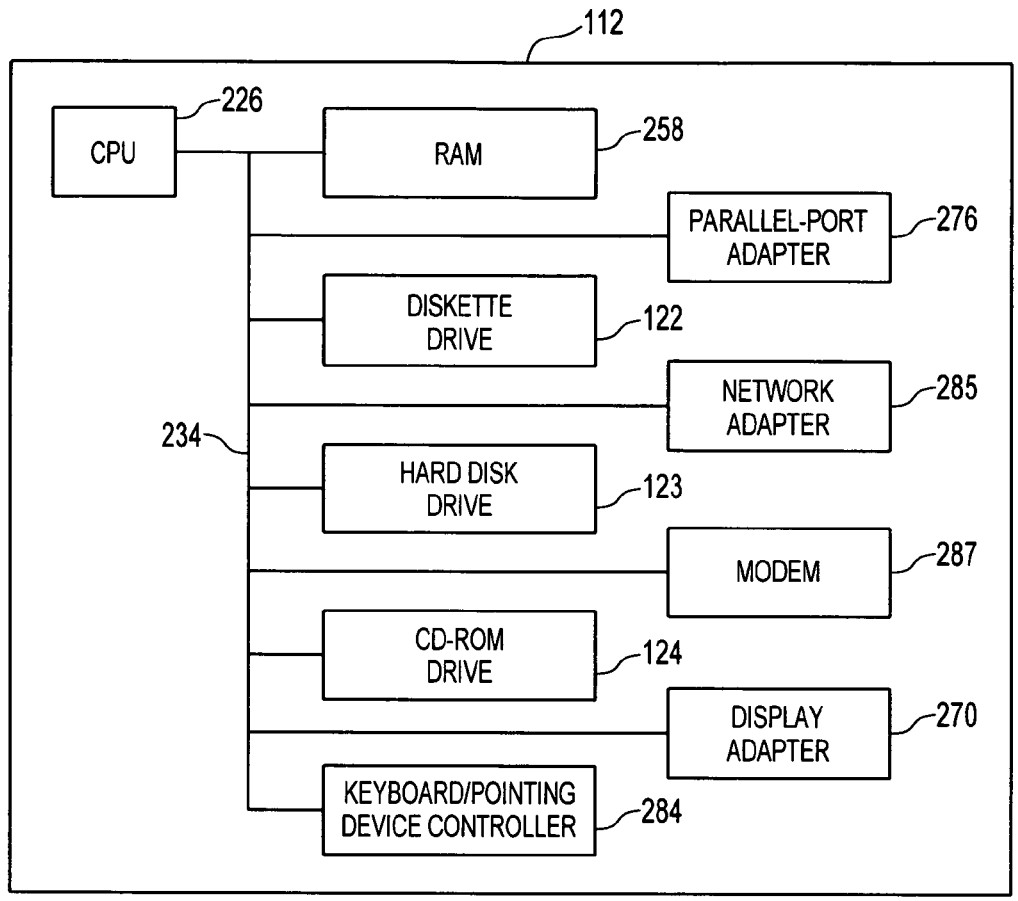
FIG. 2 illustrates a block diagram of a representative hardware environment of the processing unit of the computer system depicted in FIG. 1.

Referring to FIG. 2, there is depicted a block diagram of the principal components of processing unit 112. CPU 226 is connected via system bus 234 to RAM (Random Access Memory) 258, diskette drive 122, hard-disk drive 123, CD-ROM drive 124, keyboard/pointing-device controller 284, parallel-port adapter 276, network adapter 285, display adapter 270, and modem 287. Although the various components of FIG. 2 are drawn as single entities, each may consist of a plurality of entities and may exist at multiple levels.

Processing unit 112 includes central processing unit (CPU) 226, which executes instructions. CPU 226 includes the portion of data-processing system 110 that controls the operation of the entire computer system, including executing the arithmetical and logical functions contained in a particular computer program. Although not depicted in FIG. 2, CPU 226 typically includes a control unit that organizes data and program storage in a computer memory and transfers the data and other information between the various parts of the computer system. CPU 226 generally includes an arithmetic unit that executes the arithmetical and logical operations, such as addition, comparison, and multiplication. CPU 226 accesses data and instructions from and stores data to volatile RAM 258.

CPU 226 can be implemented, for example, as any one of a number of processor chips, or any other type of processor, which are available from a variety of vendors. Although data-processing system 110 is shown to contain only a single CPU and a single system bus, the present invention applies equally to computer systems that have multiple CPUs and to computer systems that have multiple buses that each performs different functions in different ways.

RAM 258 comprises a number if individual, volatile-memory modules that store segments of operating system and application software while power is supplied to data-processing system 110. The software segments are partitioned into one or more virtual-memory pages that each contains a uniform number of virtual-memory addresses. When the execution of software requires more pages of virtual memory than can be stored within RAM 258, pages that are not currently needed are swapped with the required pages, which are stored within non-volatile storage devices 122 or 123. RAM 258 is a type of memory designed such that the location of data stored in it is independent of the content. Also, any location in RAM 258 can be accessed directly without needing to start from the beginning.

Hard-disk drive 123 and diskette drive 122 are electro-mechanical devices that read from and write to disks. The main components of a disk drive are a spindle on which the disk is mounted, a drive motor that spins the disk when the drive is in operation, one or more read/write heads that perform the actual reading and writing, a second motor that positions the read/write heads over the disk, and controller circuitry that synchronized read/write activities and transfers information to and from data-processing system 110.

A disk itself is typically a round, flat piece of flexible plastic (e.g., floppy disk) or inflexible metal (e.g., hard disk) coated with a magnetic material that can be electrically influenced to hold information recorded in digital form. A disk is, in most computers, the primary method for storing data on a permanent or semi-permanent basis. Because the magnetic coating of the disk must be protected from damage and contamination a floppy disk (e.g., 5.25 inch) or micro-floppy disk (e.g., 3.5 inch) is encased in a protective plastic jacket. But any size of disk could be used. A hard disk, which is very finely machined, is typically enclosed in a rigid case and can be exposed only in a dust free environment.

Keyboard/pointing-device controller 284 interfaces processing unit 112 with keyboard 116 and graphical-pointing device 118. In an alternative embodiment, keyboard 116 and graphical-pointing device 118 have separate controllers. Display adapter 270 can translate graphics data from CPU 226 into video signals utilized to drive display device 114.

Finally, processing unit 112 includes network adapter 285, modem 287, and parallel-port adapter 276, which facilitate communication between data-processing system 110 and peripheral devise or other computer systems. Parallel-port adapter 276 transmits printer-control signals to printer 120 through a parallel port. Network adapter 285 connects data-processing system 110 to an un-illustrated local area network (LAN). A LAN provides a user of data processing system 110 with a means of electronically communicating information, including software, with a remote computer or a network logical-storage device. In addition, a LAN supports distributed processing, which enables data-processing system 110 to share a task with other computer systems linked to the LAN, which can also be implemented in the context of a wireless local area network (WLAN).

Modem 287 supports communication between data-processing system 110 and another computer system over a standard telephone line. Furthermore, through modem 287, data-processing system 110 can access other sources such as a server, an electronic bulletin board, and the Internet or the well-known World Wide Web.

The configuration depicted in FIG. 1 is but one possible implementation of the components depicted in FIG. 2. Portable computers, laptop computers, and network computers or Internet appliances are other possible configurations. The hardware depicted in FIG. 2 may vary for specific applications. For example, other peripheral devices such as optical-disk media, audio adapters, or chip-programming devices, such as PAL or EPROM programming devices well known in the art of computer hardware, may be utilized in addition to or in place of the hardware already depicted.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (a) information permanently stored on non-writable storage media (e.g., read-only memory devices within a computer such as CD-ROM disks readable by CD-ROM drive 124); (b) alterable information stored on writable storage media (e.g., floppy disks within diskette drive 122 or hard-disk drive 123); or (c) information conveyed to a computer by a communications media, such as through a computer or telephone network, including wireless communications. Such signal-bearing media, when carrying computer-readable instructions that direct the functions of one or more embodiments of the present invention, represent alternative embodiments of the present invention.

Figure 3:
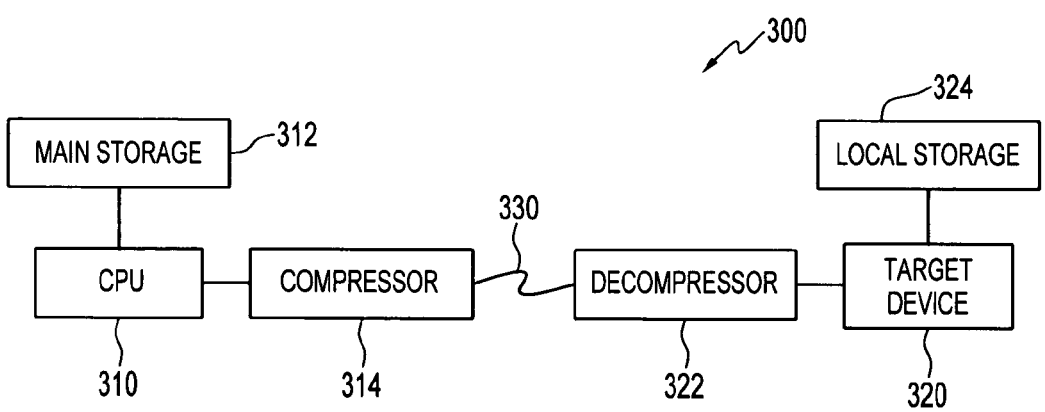
FIG. 3 illustrates a block diagram of a representative system illustrating a preferred embodiment for software stored within the memory of the computer system illustrated in FIG. 1.

With reference now to FIG. 3, there is illustrated a high-level block-diagram representation of a system employing a preferred embodiment of the present invention.

As noted above, the software executed by data-processing system 110 can be stored within one or more of RAM 258, the nonvolatile storage provided by diskette drive 122, hard-disk drive 123, CD-ROM drive 124, or a remote server accessible via modem 287 or network adapter 285. In the illustrated embodiment, various features of the software executed by data-processing system 110 are shown associated with the particular devices that execute those features.

Generally, the reference numeral 300 refers to a simplified compression/decompression system—for ease of illustration various networking, performance, and other components have been omitted. System 300 includes CPU 310 and target device 320. CPU 310 is coupled to main storage 312 and compressor 314. Target device 320 is coupled to decompressor 322 and local storage 324. In the illustrated embodiment, target device 320 is coupled to CPU 310 through link 330, which is depicted as coupling compressor 314 to decompressor 322. In an alternate embodiment, compressor 314 is a subcomponent of CPU 310, decompressor 322 is a subcomponent of target device 320, and CPU 310 couples to target device 320. One skilled in the art will understand that other suitable configurations can also be employed.

Generally, as described in more detail below, system 300 operates as follows. CPU 310 retrieves a frame-based program image (FBPI) for execution on target device 320 from main storage 312. Compressor 314 compresses the FBPI as described below, and the compressed FBPI is sent via link 330 to decompressor 322 of target device 320. In an alternate embodiment, the compressed FBPI is sent directly to target device 320, which decompresses the compressed FBPI as described below. The decompressed FBPI is stored in local storage 324 for execution by target device 320. In an alternate embodiment, the compressed FBPI is stored in local storage 324 and subsequently decompressed by decompressor 322 for execution by target device 320.

Accordingly, in one embodiment, main storage 312 is a hard disk, such as, for example, hard disk drive 123 of FIG. 1. Similarly, local storage 324 can be a CD-ROM drive, (e.g., CD-ROM drive 124 of FIG. 1) or a RAM (e.g., RAM 258 of FIG. 2). One skilled in the art will understand that other configurations can also be employed.

Together, the functions performed by compressor 314 and decompressor 322 form a two-stage compression/decompression algorithm (codec) for frame-based program images. This codec is illustrated visually in one embodiment in FIG. 4.

Figure 4:
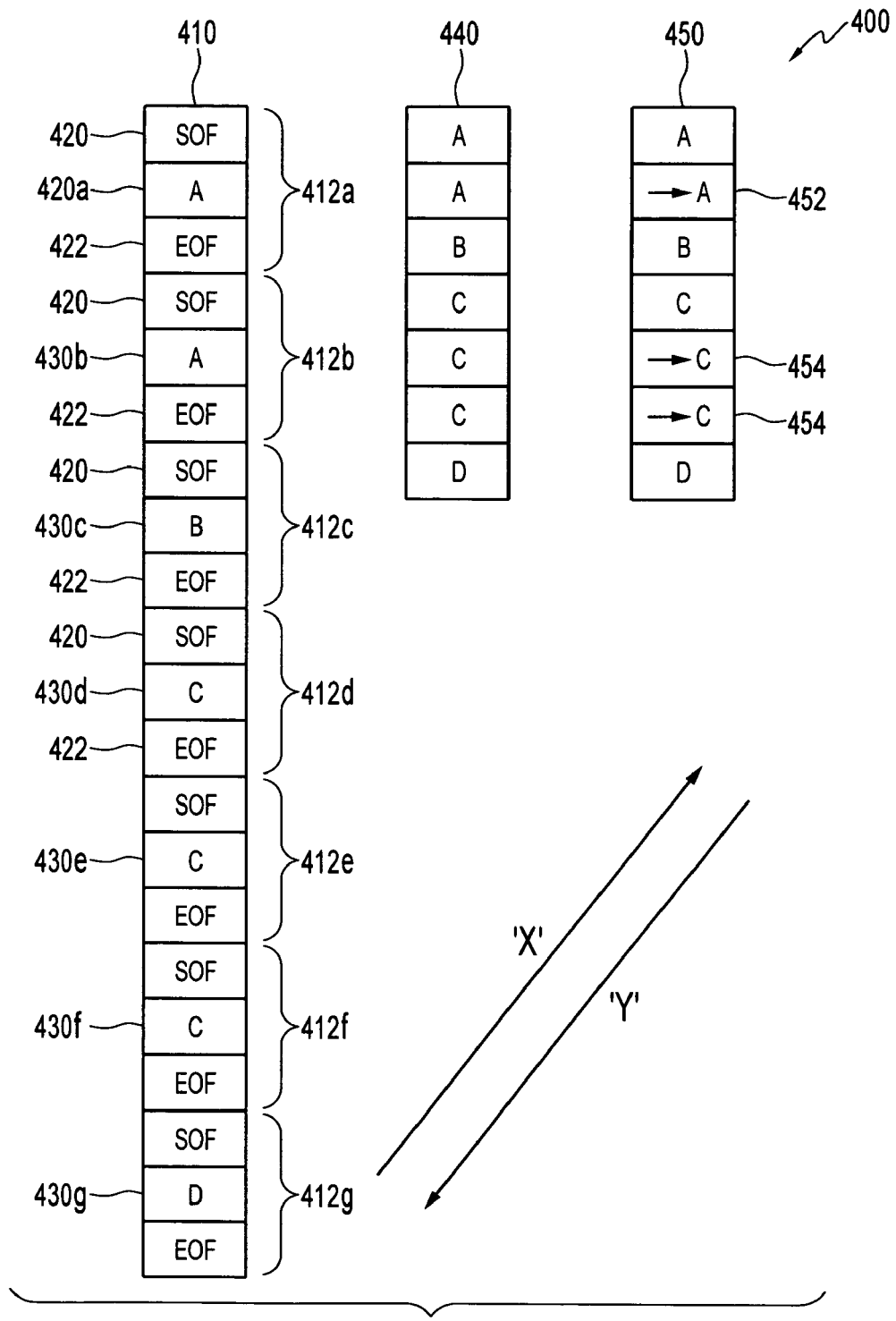
FIG. 4 illustrates a block diagram depicting representative transformations of a frame-based program image (FBPI) in accordance with a preferred embodiment of the present invention.

FIG. 4 illustrates a high-level block diagram, generally indicated by reference numeral 400, depicting the operation of a two-stage compression/decompression algorithm on an exemplary frame-based program image. For ease of illustration, various details concerning compiling, linking, binding, and/or other programming or executability features have been omitted.

Reference numeral 410 indicates an uncompressed or decompressed frame-based program image (FBPI). As illustrated, FBPI 410 includes a plurality of frames 412a-412g. For ease of illustration, FBPI 410 is shown with a limited number of frames. One skilled in the art will understand that a typical FBPI includes a much larger number of frames.

In the illustrated embodiment, each frame 412 includes start-of-frame (SOF) data 420 and end-of-frame (EOF) data 422. Generally, SOF data 420 and EOF data 422 comprise common data that begins and ends each of the plurality of frames 412. Together, SOF data 420 and EOF data 422 individually envelop or bracket a plurality of frame cores 430a-430g. Thus, for example, each frame 412 includes SOF data 420, a frame core 430, and EOF data 422.

Additionally, FBPI 410 is shown with a number of duplicate frames, which are identical in that they contain the exact same data. For example, frame core 430a "A" is identical to frame core 430b "A". Similarly, frame core 430d "C", frame core 430e "C", and frame core 430f "C" are identical to each other. One skilled in the art will understand that while the illustrated embodiment is shown with a limited number of duplicate frames, a typical FBPI 410 can contain a much larger number of duplicate frames.

In a compression operation, generally indicated by arrow "X", a first stage of compression removes the SOF/EOF data common to all frames 412. In the illustrated embodiment, SOF data 420 and EOF data 422 is removed from each and every frame 412 to generate half-compressed FBPI 440. In an alternate embodiment, SOF data 420 and EOF data 422 can be retained in one frame (e.g., the first frame 412a) or a plurality of frames, and removed from the remaining frames. As illustrated, half-compressed (or half-decompressed) FBPI 440 includes the frame cores 430a-430g concatenated after removal of the envelope data (SOF data 420 and EOF data 422).

In a second stage of compression, duplicate frame cores are replaced with pointers referring to a master frame core. For example, the second instance of frame core "A" (frame core 430b) is replaced with a pointer 452 in half-compressed FBPI 440 to generate full-compressed FBPI 450. Similarly, the second and third instances of frame core "C" (frame core 430e and frame core 430f) are replaced with pointers 454 in full-compressed FBPI 450. Generally, pointers 452 and 454 are pointers referring to the master copy of the identical frame core they replace in the full-compressed FBPI.

In the illustrated embodiment, the first instance of a duplicate frame core serves as the master copy to which subsequent (in the FBPI series) frame core pointers refer. In an alternate embodiment, the last instance of a duplicate frame core serves as the master copy to which earlier (in the FBPI series) frame core pointers refer. One skilled in the art will understand that other configurations can also be employed, including selecting a particular instance of a plurality of duplicate frame cores to serve as a master copy.

In a decompression operation, generally indicated by arrow "Y", a first stage decompression identifies pointers in a compressed FBPI, and replaces the pointers with the master copies to which they refer, to generate a half-decompressed FBPI. For example, pointer 452 is replaced in compressed FBPI 450 with frame core "A" to generate half-decompressed FBPI 440. Similarly, pointers 454 are replaced with frame core "C". Thus, half-decompressed FBPI 440 includes full copies of all duplicate frame cores, in the program sequence for the full-decompressed (i.e., original) FBPI 410.

In a second stage decompression, common envelope data (e.g., SOF data and EOF data) is added to each frame core of the half-decompressed FBPI 440 to generate full-decompressed FBPI 410. Thus, for example, SOF data 420 is appended to the beginning of frame core 430a "A", frame core 430b "A" and so forth. Similarly, EOF data 422 is appended to the end of frame core 430a "A", frame core 430b "B" and so forth. In this manner, common envelope data is appended to every frame core. While common envelope data in the illustrated embodiment include SOF data 420 and EOF data 422, one skilled in the art will understand that other common envelope data can also be employed.

Figure 5:
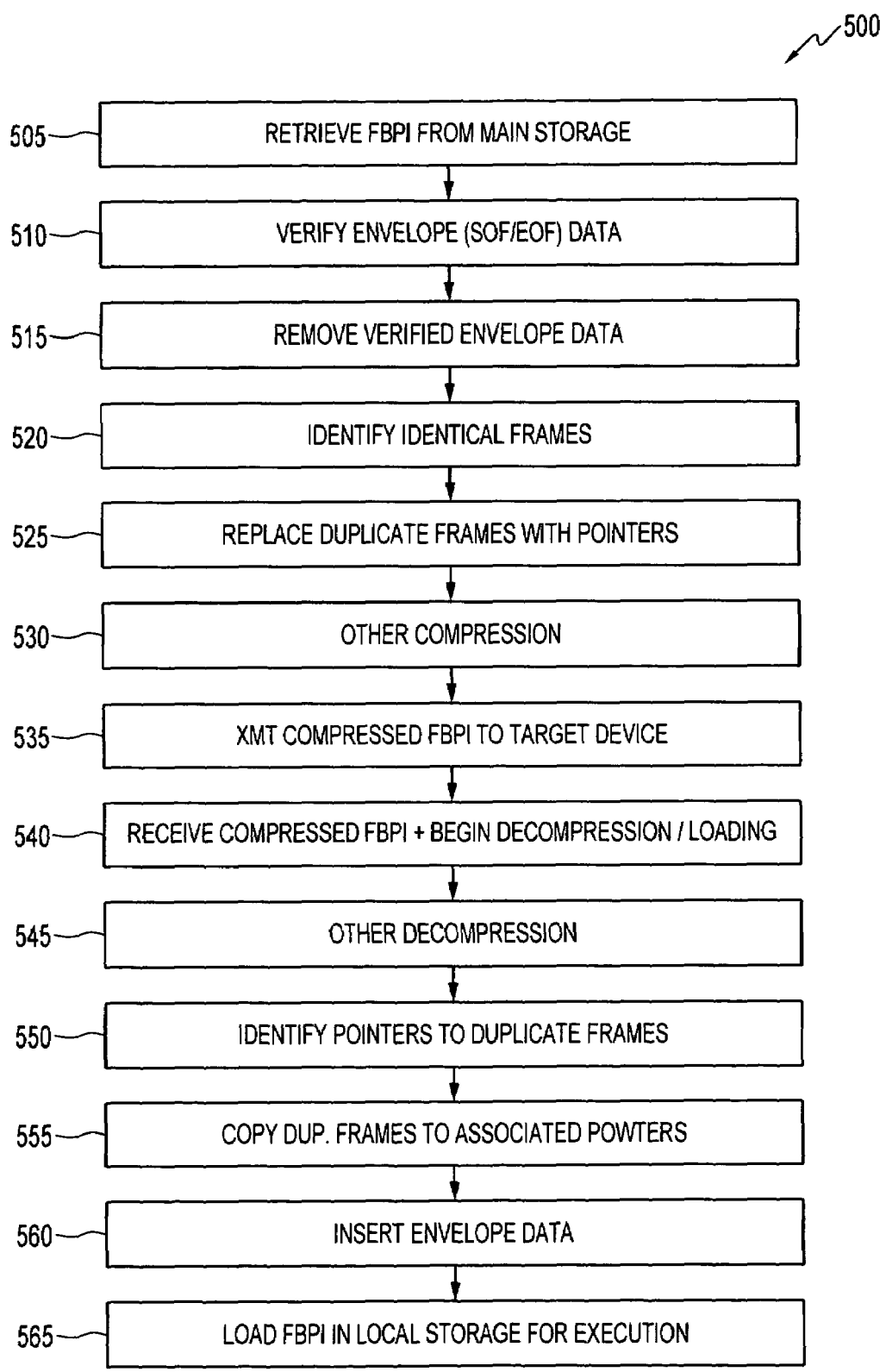
FIG. 5 illustrates a high-level flow chart depicting logical operational steps, which may be implemented in accordance with a preferred embodiment of the present invention.

FIG. 5 illustrates a high-level flow chart 500 that depicts logical operational steps, which may be implemented in accordance with a preferred embodiment of the present invention. As indicated at block 505, the process begins, wherein a FBPI is retrieved from main storage. This operation can be performed by, for example, CPU 310 retrieving an FBPI from main storage 312 of FIG. 3. As indicated next at block 510, common SOF/EOF or envelope data is verified. This operation can be performed by, for example, compressor 314 of FIG. 3.

As described thereafter at block 515, verified common envelope data is removed from each frame of the FBPI, generating a half-compressed FBPI. This operation can be performed by, for example, compressor 314 of FIG. 3. Next, as illustrated at block 520, identical frames (or frame cores) are identified. This operation can be performed by, for example, compressor 314 of FIG. 3. Next, as indicated at block 525 duplicate frames (or frame cores) are replaced with pointers, generating a full-compressed FBPI. This operation can be performed by, for example, compressor 314 of FIG. 3.

As described thereafter at block 530, other compression algorithms can also be employed to the full-compressed FBPI. Next, as illustrated at block 535, the compressed FBPI is transmitted to a target device for decompression and execution. This operation can be performed by, for example, CPU 310 of FIG. 3. Next, as illustrated at block 540, the compressed FBPI is received by the target device and loading and decompression begins. This operation can be performed by, for example, target device 320 of FIG. 3.

Next, as depicted at block 545 general decompression occurs, if other compression algorithms were employed at block 530. Next, as illustrated at block 550, pointers to master copies of duplicate frames (or frame cores) are identified. This operation can be performed by, for example, decompressor 322 of FIG. 3. As described thereafter at block 555, duplicate frames are copied to their associated pointers, replacing the pointers with the frames (or frame cores) to which they point, to generate a half-decompressed FBPI. This operation can be performed by, for example, decompressor 322 of FIG. 3.

As described thereafter at block 560, common envelope data is appended to each frame core to generate a full-decompressed FBPI. This operation can be performed by, for example, decompressor 322 of FIG. 3. As described above, this operation can include copying envelope data from a designated frame that retained SOF/EOF data during compression operations. Next, as described at block 565, the decompressed FBPI is loaded into local storage for execution. This operation can be performed by, for example, target device 320 and local storage 324 of FIG. 3.

Accordingly, the embodiments provide for a system, apparatus, and method for improved compression/decompression in frame-based program images. In particular, the removal of common envelope data and replacement of identical duplicate frames provide a codec that is more flexible, while remaining uncomplicated as compared to previous systems and methods. Further, the described two-stage codec is minimally intrusive and takes advantage of the fixed-size frames in a frame-based program image to achieve 30 to 50 percent compression of an FBPI, significantly reducing storage requirements. Additionally, the disclosed codec provides all of the disclosed advantages without the cumbersome overhead required by other compression algorithms.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for compressing a frame-based program image (FBPI), comprising:
   identifying common envelope data in the FBPI, said envelope data comprising start-of-frame (SOF) data and end-of frame (EOF) data;
   removing identified common envelope data from the FBPI;
   identifying at least one instance of an identical repeated frame of the FBPI;
   replacing a first instance of an identified identical repeated frame with a pointer to a second instance of the identified identical repeated frame; and
   replacing the removed common envelope data with a single instance of said envelope data.

2. The method of claim 1, wherein the first instance of the identified repeated frame appears after the second instance of the identified repeated frame in an execution sequence of frames of the FBPI.

3. The method of claim 1, wherein the first instance of the identified repeated frame appears before the second instance of the identified repeated frame in an execution sequence of frames of the FBPI.

4. The method of claim 1, further comprising replacing the removed common envelope data with a single instance of the envelope data.

5. A method for decompressing a compressed frame-based program image (FBPI), comprising:
   identifying at least one pointer in a compressed FBPI, wherein the at least one pointer comprises a reference to an identical repeated frame of the FBPI;
   replacing the identified at least one pointer with the identical repeated frame to which the at least one pointer refers, to generate a half-decompressed FBPI; and
   inserting envelope data into the half-decompressed FBPI to generate a full-decompressed FBPI.

6. The method of claim 5, wherein the envelope data comprises start-of-frame (SOF) data and end-of-frame (EOF) data.

7. The method of claim 5, wherein the compressed FBPI comprises a sequence order of frames and the at least one pointer appears after the identical repeated frame to which the at least one pointer refers.

8. The method of claim 5, wherein the compressed FBPI comprises a sequence order of frames and the at least one pointer appears before the identical repeated frame to which the at least one pointer refers.

9. The method of claim 5, further comprising loading the full-decompressed FBPI into a local storage for execution.

10. The method of claim 5, further comprising loading the compressed FBPI into a local storage for execution-time decompression.

11. A computer program product for processing a frame-based program image (FBPI), the computer program product having a computer-readable storage medium with a computer program embodied thereon, the computer program comprising:
   computer code for identifying common envelope data in the FBPI;
   computer code for removing identified common envelope data from the FBPI;
   computer code for identifying at least one instance of an identical repeated frame of the FBPI; and
   computer code for replacing a first instance of an identified identical repeated frame with a pointer to a second instance of the identified identical repeated frame.

12. The computer program product of claim 11, wherein the envelope data comprises start-of-frame (SOF) data and end-of-frame (EOF) data.

13. The computer program product of claim 11, wherein the first instance of the identified repeated frame appears after the second instance of the identified repeated frame in an execution sequence of frames of the FBPI.

14. The computer program product of claim 11, wherein the first instance of the identified repeated frame appears before the second instance of the identified repeated frame in an execution sequence of frames of the FBPI.

15. The computer program product of claim 11, further comprising replacing the removed common envelope data with a single instance of the envelope data.

16. The computer program product of claim 11, the computer program further comprising:
   computer code for identifying at least one pointer in a compressed FBPI, wherein the at least one pointer comprises a reference to an identical repeated frame of the FBPI;
   computer code for replacing the identified at least one pointer with the identical repeated frame to which the at least one pointer refers, to generate a half-decompressed FBPI; and
   computer code for inserting envelope data into the half-decompressed FBPI to generate a full-decompressed FBPI.

17. The computer program product of claim 16, further comprising computer program code for loading the full-decompressed FBPI into a local storage for execution.

18. The computer program product of claim 16, further comprising computer program code for loading the compressed FBPI into a local storage for execution-time decompression.

* * * * *